United States Patent [19]

Kumazaki

[11] 4,383,816
[45] May 17, 1983

[54] MULTIPLE MOLD CLAMPING APPARATUS
[75] Inventor: Hiroshi Kumazaki, Numazu, Japan
[73] Assignee: Toshiba Kikai Kabushiki Kaisha, Tokyo, Japan
[21] Appl. No.: 370,590
[22] Filed: Apr. 21, 1982
[30] Foreign Application Priority Data May 21, 1981 [JP] Japan .................................. 56-77037

[51] Int. Cl.³ ............................................. B29F 1/00
[52] U.S. Cl. ................................. 425/451.9; 425/34 R; 425/47; 425/451.2; 425/595
[58] Field of Search ..................... 425/23, 24, 25, 34, 425/46, 47, 451.2, 451.9, 590, 594, 595

[56] References Cited

U.S. PATENT DOCUMENTS

| | | | |
|---|---|---|---|
| 2,371,547 | 3/1945 | Rosenlund et al. | 425/451.9 X |
| 3,104,433 | 9/1963 | Hoern | 425/590 X |
| 3,137,032 | 6/1964 | MacMillan | 425/23 X |
| 3,345,691 | 10/1967 | Ooki | 425/595 X |
| 3,550,196 | 12/1970 | Gaguit | 425/34 |
| 3,611,502 | 10/1971 | Floyancic | 425/590 |
| 3,666,387 | 5/1972 | Cyriox | 425/590 X |
| 3,669,593 | 6/1972 | Cyriox | 425/451.2 X |
| 3,669,599 | 6/1972 | Snider et al. | 425/595 |
| 3,704,973 | 12/1972 | Renfrew et al. | 425/451.2 X |
| 3,756,757 | 9/1973 | Grundmann | 425/495 X |
| 4,318,682 | 3/1982 | Larson et al. | 425/451.9 X |

FOREIGN PATENT DOCUMENTS 802014 9/1958 United Kingdom .................. 425/34

Primary Examiner—J. Howard Flint, Jr.
Attorney, Agent, or Firm—Cushman, Darby & Cushman

[57] ABSTRACT

Multiple mold clamping apparatus comprising a plurality of mold clamping stations, each having a fixed die plate with a fixed die, a rest plate which is separated from the fixed die plate by a certain distance a movable die plate with a die opposingly facing the fixed die, and a moving device for moving the movable die plate, a hydraulic cylinder unit is slidably mounted beneath the rest plate and includes a piston rod defining an end surface portion for contacting the movable die plate, a power transmitting device mounted on the movable die plate for transmitting clamping force from the piston rod to the movable die, and a conveying device for conveying the hydraulic cylinder unit from one mold clamping station to another.

19 Claims, 6 Drawing Figures

MULTIPLE MOLD CLAMPING APPARATUS

BACKGROUND OF THE INVENTION

The invention relates to a mold clamping apparatus for an injection molding machine and more specifically, to a multiple mold clamping apparatus for the machine.

DESCRIPTION OF THE PRIOR ART

Two types of molding clamps for injection molding machining have been conventionally available. Referring to FIG. 1, in one type, two molding clamps 1 and 2 are juxtaposed and an injector 3 is moved in the direction indicated by an arrow "a" in FIG. 1 (Prior Art). In the other type, as shown in FIG. 2, a plurality of molds 8, each including a mold opening device 9 located between a fixed plate 5 and a moving plate 6, are employed for clamping the mold 8. Mold opening and release of products from the mold 8 are carried out at stations A and B. In the conventional clamp arrangements of FIGS. 1 and 2, injection molding is sequentially effected by moving the mold 8 or the injector 3 so that the cooling time of the injected molded article can be reduced thereby improving production of molded articles per unit time.

However, the conventional mold clamps of FIG. 1 result in increased production costs since at least two mold clamps are needed. Also, utilization of the FIG. 1 mold clamp creates the disadvantage of increasing the space necessary to accommodate the clamps.

In the conventional mold clamps of FIG. 2, large scale systems are impractical since an increase in size of mold 8, including mold opening device 7, necessarily increase the weight of the system so that control for moving mold 8 becomes extremely complicated. Moreover, increased friction is likely to occur on the sliding surface of fixed plate 5 or the like due to the weight of such a heavy mold 8.

SUMMARY OF THE INVENTION

The present invention provides a mold clamping apparatus which is capable of eliminating the above-mentioned problems associated with the prior art systems. The apparatus of the present invention reduces molding cycle times, production costs and the necessary installation space, yet is capable of easily clamping a plurality of molds in a predetermined order.

To accomplish these improved results, the present invention provides a novel multiple mold clamping apparatus which comprises a plurality of mold clamping stations. The clamping apparatus of the present invention generally provides a system in which multiple mold clamping stations can be securely clamped in any predetermined desired order.

Each clamping station preferably comprises a fixed die plate which defines a fixed portion of a die cavity for molding an article therein and, a rest plate opposingly disposed to the fixed die plate and being separated therefrom by a predetermined distance. A movable die plate which defines the other portion of the die cavity is mounted for reciprocal movement between the fixed die plate and the rest plate. Thus, when the fixed and movable die plates are in contacting relationship, a complete die cavity is formed into which a molten material, for example, molten plastic, can be injected by any conventional means to effect molding of a desired article. The reciprocal movement of the movable die relative to the fixed die is preferably provided by utilizing hydraulic cylinders which are in and of themselves conventional in the art.

In order to securely effect clamping engagement of the fixed and movable die plates, at least one cylinder unit is preferably slidably mounted to the rest plate. The cylinder unit includes a hydraulically operable piston which defines a surface for contacting the movable die plate.

Movement of the cylinder unit between predetermined ones of the mold clamping stations can preferably be provided by a driven chain conveyor which is operatively associated with the cylinder unit so as to move it in a predetermined manner between mold clamping stations.

Alternately, the cylinder unit may be integrally provided with appropriate means for conveying it between mold clamping stations. For example, the present invention contemplates that a rack can be disposed along the path of travel of the cylinder unit between mold clamping stations and a motor integrally associated with the cylinder unit for providing driven power thereto. Thus, when it is desired to move the cylinder unit to the next clamping station, the motor operates and, due to its intermeshing relationship with the gear rack, conveys the cylinder unit along the desired path.

Preferably, an encoder may be operatively associated with the apparatus of the present invention so that the position of the cylinder unit can be controlled. Suitable state of the art mechanical or electrical position sensors are already available and when operatively coupled with the present invention provide a means for controlling the movement of the cylinder unit.

Since different die cavities may be utilized from clamping station to clamping station, the movable die plate preferably includes an adjustment device to ensure that sufficient clamping force will be transmitted thereto by virtue of the cylinder unit. Preferably, the adjusting device includes a raised boss fixed to the movable die which defines a female threaded cavity. A male threaded shaft may then be threadingly engaged with the female threaded cavity so that turning movement thereof will adjust the distance between the movable die plate and the cylinder unit.

Turning movement of the male threaded shaft is provided by an axially disposed spline shaft, one end of which is reciprocably slidable with the male threaded shaft while the other end is rotatably mounted to the movable die plate. Thus, as the spline shaft is rotated by virtue of suitable driving means, the male threaded shaft is displaced relative to the cylinder unit by virtue of its threading engagement with the female threaded cavity.

Other aspects and advantages of the present invention will become more clear after thorough consideration of the following detailed description of the preferred exemplary embodiments.

DETAILED DESCRIPTION OF THE PREFERRED EXEMPLARY EMBODIMENTS

Figure 1:
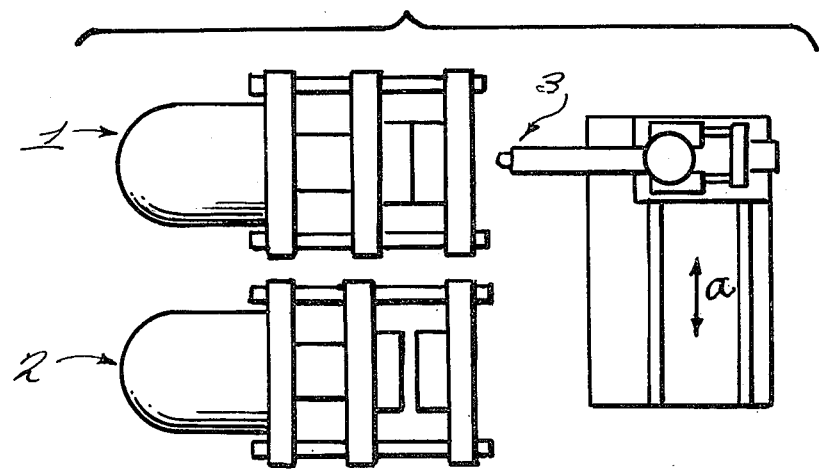
FIG. 1 shows a plan view of a prior art device of the type having two mold clamps and one injector.
Figure 2:
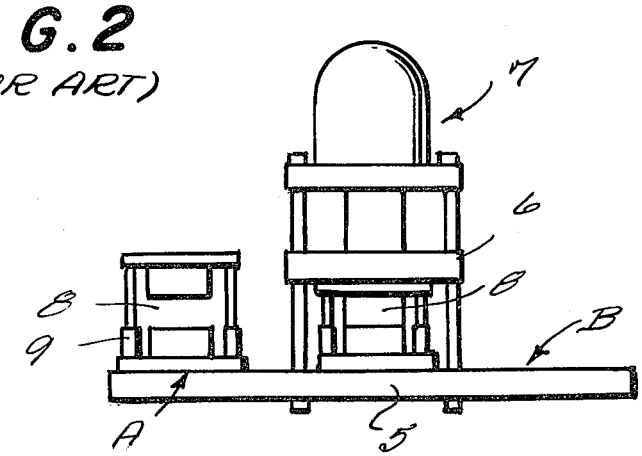
FIG. 2 shows a front view of another prior art device of the type having a plurality of molds and one mold clamp.
Figure 3:
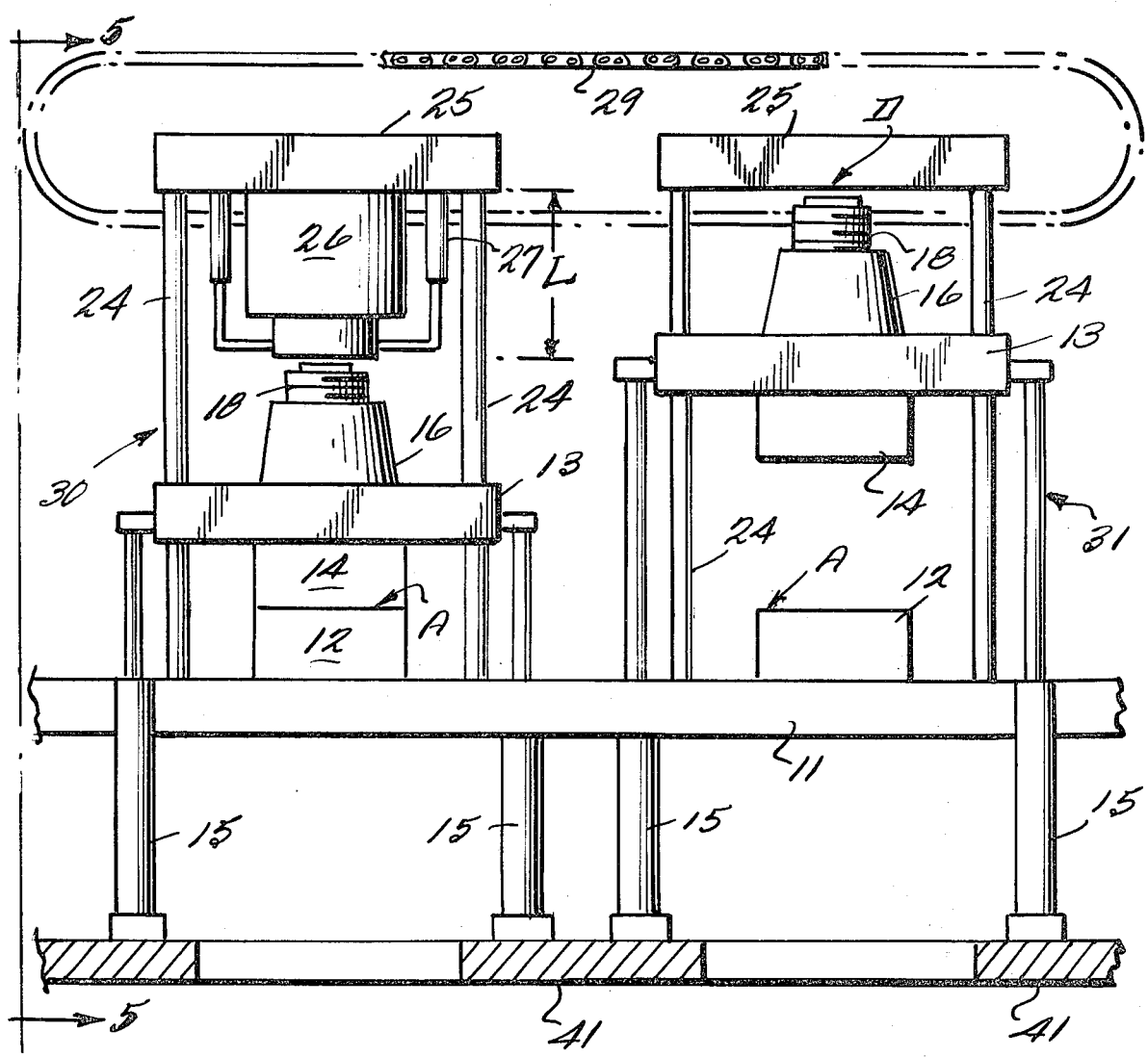
FIG. 3 shows a front elevational view of one embodiment of the multiple mold clamping apparatus of the present invention.
Figure 5:
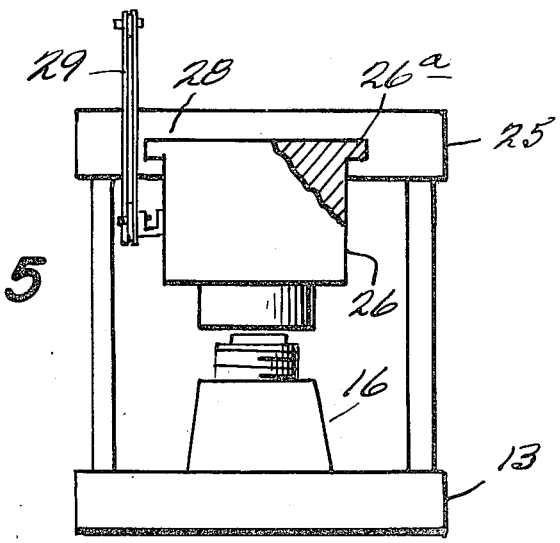
FIG. 5 shows a side elevational view taken along line 5—5 as shown in FIG. 3.
Figure 4:
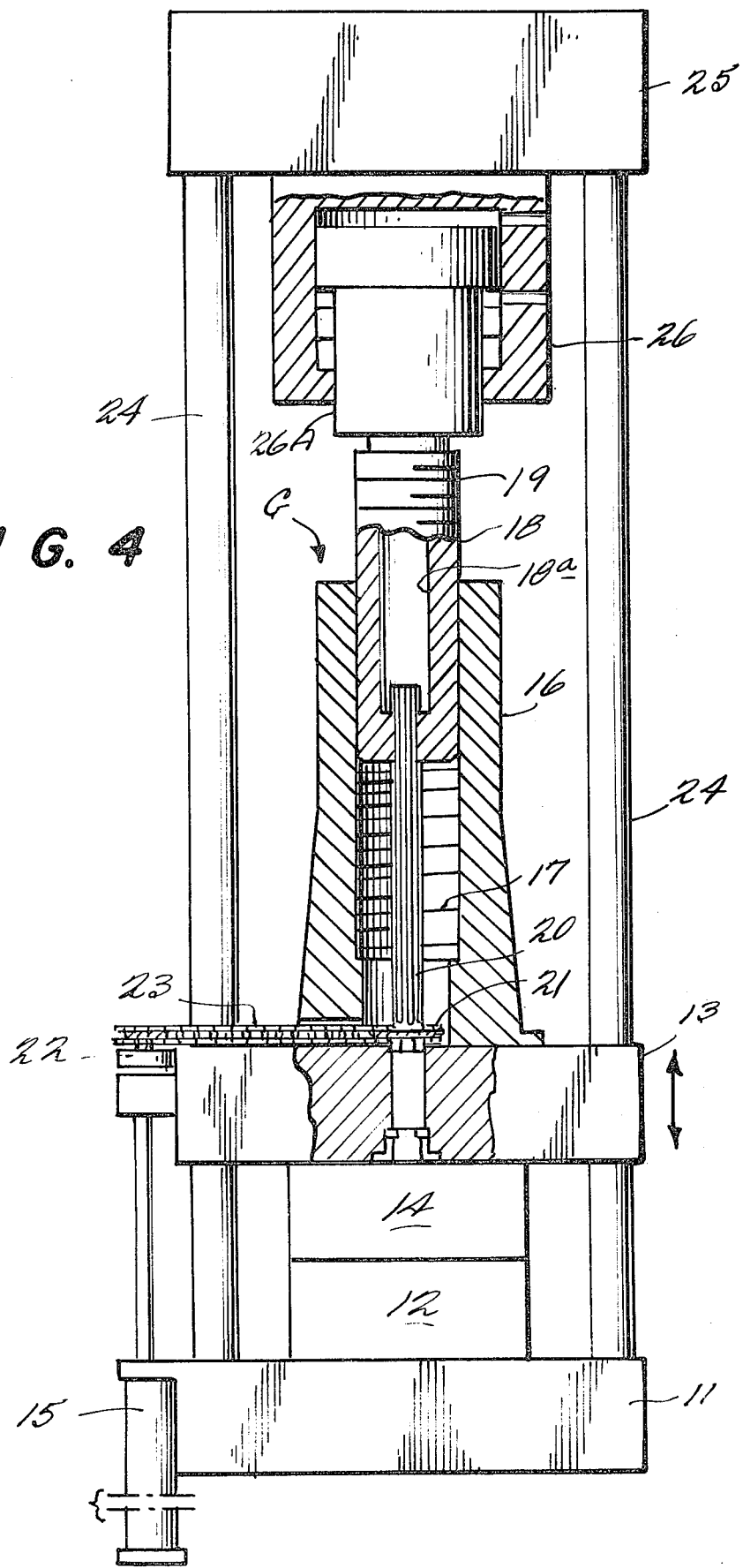
FIG. 4 shows an enlarged front elevational view partly in section of the mold clamping apparatus embodiment shown in FIG. 3.

Reference will now be made to FIGS. 3-5, wherein an embodiment of vertical mold clamping apparatus is illustrated.

Mold clamping stations 30, 31 having identical construction are juxtaposed on a fixed die plate 11 which is, in turn, fixedly supported by a base plate 41 via cylinders 15. Die plate 11 supports a fixed die 12 having a lower portion of a die cavity on its upper side for molding articles therein. A movable die plate 13 dependently supports a moving die 14 which contacts fixed die 12 along the mold joint surface "A". A plurality of cylinders 15 are provided to reciprocably move die plate 13 relative to fixed die plate 11 along tie bars 24.

Referring to FIG. 4, it is seen that a boss 16 having its lower end portion connected to the upper surface of movable die plate 13, defines a cylindrical cavity having female threads 17. An elevating shaft 18 is provided having male threads 19 on its external surface for mating with the female threaded cavity 17 of boss 16. Shaft 18 interiorly defines a spline cavity 18a for operatively and slidingly accepting spline shaft 20. Spline shaft 20 is turnably supported at its lower end on movable die plate 13 and is operatively engaged on its upper end in spline cavity 18a defined on the interior portion of elevating shaft 18.

Sprocket 21 is fixedly provided on the lower portion of spline shaft 20 ane engages a chain 23 driven by a motor 22. Therefore, when spline shaft 20 rotates due to the operation of motor 22, elevating shaft 18 responsively rotates thereby adjusting shaft 18 in cavity 18a by virtue of the mating threads 17, 19. Since motor 22 is reversible (e.g. will responsively rotate spline shaft 20 either clockwise or counterclockwise as desired), end surface D can be reciprocably adjusted relative to surface C of boss 16.

Rest plate 25 is opposingly disposed over moving die plate 13 and is separated a predetermined distance therefrom so that movable die plate 13 can reciprocably move therebetween guided by tie bars 24.

Mold clamping cylinder unit 26 is preferably a single operation hydraulic cylinder. Extension or retraction of a ram 26A is effected by a sub-cylinder 27 disposed outside the unit. Mold clamping cylinder unit 26 is axially disposed between end surface D of elevating shaft 18 and rest plate 25 at the time of mold clamping operation and operates in the axial direction so as to increase dimension "L" due to ram 26A contacting the end surface "D".

As shown in FIG. 5, flange 26a of mold clamping cylinder unit 26 slidably cooperates with guide grooves 28 formed in rest plate 25 and thus can be slidably moved therein by driven chain 29. With reference to FIG. 3, it can be seen that after molding operations are complete with respect to molding station 30, the mold clamping cylinder unit 26 can be conveyed by chain 29 to the next adjacent molding station 31 by virtue of cooperating flange 26a in groove 28. Of course, the movable die plate 13 of molding station 31 must be withdrawn from rest plate 25 as shown by clamping station 31 of FIG. 3 so that dies 12, 14 are brought into contacting relationship so as to provide sufficient space for clamping cylinder unit 26 to be moved between rest plate 25 and end surface "D".

The extent of travel of chain 29 is limited by suitable driving device (not shown) and thus, responsively stops chain 29 at a predetermined position in a mold clamping system having a plurality of juxtaposed mold clamping stations 30, 31 (e.g. two stations in the embodiment of FIGS. 1-4). Thus, the mold clamping cylinder unit 26 can be positioned in a predetermined one of the mold clamping station, perform the mold clamping operation, and thereafter move sequentially to the next subsequent mold clamping station thereby repeating the entire clamping operation. Although the mold clamping cylinder unit 26 has been described as being driven by a chain, other suitable driving means may, of course, be advantageously utilized, such as, for example, hydraulic cylinders, or the like.

Figure 6:
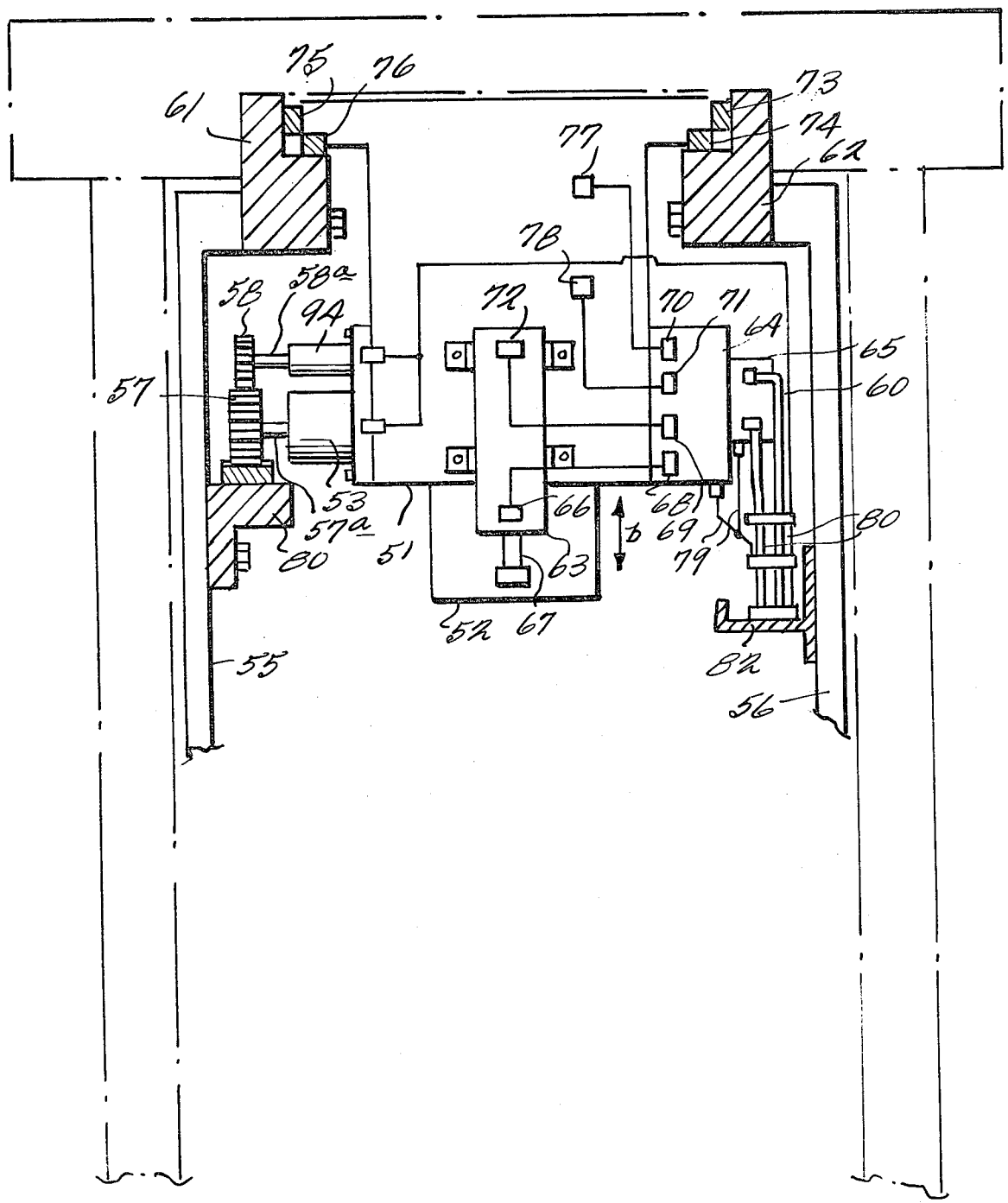
FIG. 6 is a side view of another embodiment of the present invention depicting the integrally provided conveying system of the cylinder unit.

FIG. 6 illustrates another embodiment of the present invention wherein the mold clamping cylinder unit is capable of self-conveyance along a predetermined path between clamping stations.

Referring to FIG. 6, it can be seen that mold clamping cylinder unit 51 is supported by bearings 73, 74, 75 and 76 on guide rails 61, 62 mounted on the top portion of vertical frames 55, 56 respectively, and extend along the path of travel of cylinder unit 51 between the plurality of mold clamping stations (not shown in FIG. 6 for clarity).

Piston rod 52 depends from mold clamping cylinder unit 51 and is capable of reciprocal movement (noted by arrow "b"). Cylinder 63 mounted on the cylinder unit 51 includes a piston member 67 connected to the surface portion of piston rod 52 and thereby enables piston rod 52 to be capable of reciprocal movement (arrow b).

Hydraulic switching valve 64 is mounted to cylinder unit 51 and includes hydraulic ports 70, 71 interconnected with ports 77, 78, respectively, on cylinder unit 51 by suitable hydraulic tubing. Furthermore, hydraulic ports 68, 69 are similarly interconnected with ports 66, 72, respectively, on cylinder 63 by suitable hydraulic tubing. Hydraulic distributor 65 mounted on valve 64 supplies hydraulic fluid under pressure to valve 64.

A motor 53 mounted on cylinder unit 51 includes a pinion gear 57 on drive shaft 57a of the motor 51 and meshes with a rack gear 54 mounted on a supporting plate 80. The rack gear 54 is disposed along the path of travel of cylinder unit 51 between the plurality of clamping stations.

A rotary encoder 59 is preferably mounted on the cylinder unit 51 and includes a pinion gear 58 on the encoder shaft 58a. Pinion gear 58 meshes with pinion gear 57 thereby enabling the encoder to sense the position of the cylinder unit 51 as it moves along gear rack 54.

Supporting plate 82 mounted on frame 56 provides support for a bundle of wires 60, 79 and tubes 80. Wire 60 is provided for supplying electrical power to the motor 53 and for transmitting a position signal produced by the rotary encoder 59 by virtue of its engagement with motor 53 via meshing pinion gears 57, 58 to a controller (not shown). The controller utilizes the position signal to properly position the cylinder unit 51 relative to each of the plurality of mold clamps. Thus, as motor 53 moves clamping unit 51 between adjacent ones of the mold clamps, the encoder will responsively sense such movement by virtue of intermeshing pinion gears 57, 58 and will transmit a position signal to the controller (not shown). The controller will, therefore, interpret the position signal generated by encoder 59 and will stop the movement of cylinder unit 51 in the proper predetermined position relative to each of said mold clamps.

While an encoder is shown in the embodiment of FIG. 6, it should be appreciated that other state of art position sensing devices may also be advantageously utilized according to the present invention.

Although cylinder 63 and piston member 67 are suitable for reciprocably moving piston rod 52, as mentioned above, it is also possible to utilize elevating shaft 18 and motor 22 (shown in FIG. 4) by providing a slightly different operative sequence for motor 22. Furthermore, although switching valve 64 and distributor 65 are mounted on the cylinder unit 51 as mentioned above, valve 64 and distributor 65 may be provided on a hydraulic power unit (not shown) which supplies hydraulic fluid to cylinder unit 51 via suitable flexible tubes and is remotely located relative to cylinder unit 51.

Also, while reference herein has been made to a slidably movable cylinder unit which is capable of being conveyed between predetermined ones of the mold clamping stations, it should be appreciated that such an arrangement represents one of the more preferable embodiments of the present invention. Thus, it is also contemplated that each mold clamping station could advantageously utilize a fixed cylinder unit in conjunction with the other novel features of the present invention as discussed above.

Thus, while the present invention has been herein described in what is presently conceived to be the most preferred embodiments thereof, it will be understood to those in the art that many modifications may be made thereof within the scope and spirit of the present invention, which scope is to be accorded the broadest interpretation of the appended claims so as to encompass all equivalent structures, devices, or assemblies.

What is claimed is:

1. Multiple mold clamping apparatus comprising:
   a plurality of mold clamping stations, each station comprising fixed die plate means defining a first die cavity, a rest plate opposingly disposed to said fixed die plate means and being fixedly separated therefrom by a predetermined distance; movable die plate means slidably reciprocable between said fixed die plate means and said rest plate defining a second die cavity opposing said first die cavity so that when said movable die plate means is moved to a contacting relationship with said fixed die plate means, said first and second die cavities together define a molding cavity for molding an article therein; and moving means for reciprocably moving said movable die plate means relative to said fixed die plate means;
   at least one hydraulic cylinder unit slidably mounted between said rest plate and said movable die plate means including piston means reciprocably movable in said cylinder unit for contacting said movable die plate means; and
   conveying means for conveying said cylinder unit from one molding station to another.

2. An apparatus as in claim 1, wherein said movable die plate means includes force transmitting means for transmitting clamping force to said movable die having a rod, one end portion of which opposingly faces said piston means, and rod moving means for moving the rod into contacting relationship with said piston means thereby transmitting force from said piston means to said movable die plate means.

3. Multiple mold clamping apparatus as in claim 1, wherein said conveying means is integrally provided with said cylinder unit.

4. Multiple mold clamping apparatus as in claim 3, wherein said conveying means comprises:
   a motor mounted on said cylinder unit;
   a gear rack fixedly mounted to said molding stations along the direction of the path of conveyance of said cylinder unit therebetween; and
   engaging means for operatively engaging said motor and said gear rack.

5. Multiple mold clamping apparatus as in claim 1 or 4, wherein said conveying means further comprises encoder means operatively associated with said cylinder unit for electrically encoding the relative position of said cylinder unit.

6. Multiple mold clamping apparatus as in claim 1, wherein said conveying means comprises:
   a sprocket mounted on said cylinder unit;
   a chain matingly engaged with said sprocket; and
   driving means for driving said chain.

7. Multiple mold clamping apparatus as in claim 1, wherein said hydraulic cylinder unit further includes a second cylinder unit for reciprocably and adjustably moving said piston means to a predetermined position prior to mold clamping operation.

8. Multiple mold clamping apparatus as in claim 2, wherein said force transmitting means comprises:
   a boss fixedly mounted on said movable die plate including means defining an internal female threaded cavity;
   a shaft having male threads on its external surface for threadingly mating with said female threads and having means defining an internal spline cavity;
   a spline shaft having one end turnably supported on said movable die plate, the other bend being slidably engageable with said spline cavity; and
   rotating means for rotating said spline shaft thereby responsively rotating and adjustably moving said shaft due to said male and female thread engagement.

9. Multiple mold clamping apparatus as in claim 8, wherein said rotating means comprises:
   a spline sprocket fixedly mounted on said spline shaft;
   a spline chain for mating engaging with said spline sprocket; and
   spline chain driving means for driving said spline chain.

10. A mold clamping apparatus for securely clamping molding dies comprising:
    a plurality of molding stations each including fixed die means and movable die means which together define a die cavity for molding an article therein, means for reciprocably moving said movable die means relative to said fixed die means, a fixed plate opposingly disposed relative to said fixed die means thereby defining a space therebetween through which said movable die means moves;
    cylinder means for securely clamping said fixed and movable die means of each of said molding stations in a predetermined order, said cylinder means including piston means defining a surface for contacting a portion of said movable die means, said piston means being reciprocably operable between clamping and non-clamping positions so that in said clamping position, clamping force is transmitted to said movable die by virtue of said surface being in contact with a portion of said movable die thereby securely locking said movable and fixed die means relative to one another; and conveying means for conveying said cylinder means between predetermined ones of said molding stations.

11. An apparatus as in claim 10, wherein said movable die means comprises:

a movable member including a die plate fixedly attached thereto, said movable member defining an axial female threaded cavity;

adjusting means for adjusting said movable member so that contacting relationship can be effected between said cylinder means and said movable die means, said adjusting means including a male threaded turning member axially disposed and threadingly engageable with said female threads in said cavity; and turning means for axially turning said turning member relative to said movable member thereby axially adjusting said movable member to maintain contact with said cylinder means.

12. An apparatus as in claim 11, wherein said turning member defines an axial interior cavity, and wherein said turning means includes:

a spline shaft slidably connected to said interior cavity at one end and rotatably mounted to said movable member at the other end thereof, said spline shaft being axially disposed in said female threaded cavity; and motor means operatively connected to said spline shaft for responsively and axially turning said spline shaft and said turning member in predetermined directions so that as said turning member turns, said spline shaft axially and slidingly cooperates with said interior cavity as longitudinal adjustment of said turning member is effected due to the engaging relationship of said male and female threads.

13. An apparatus as in claim 10, 11 or 12 wherein said conveying means comprises:

guide means defining at least one slot in said fixed plate;

flange means associated with said cylinder means slidably engageable with said guide means; and drive means operatively connected to said cylinder means for slidably conveying said cylinder means between predetermined ones of said molding stations.

14. An apparatus as in claim 13 wherein said drive means includes:

a sprocket associated with said cylinder means;

chain means operatively mated with said sprocket for moving said cylinder means; and motor means for driving said chain means in predetermined directions.

15. An apparatus as in claim 10 wherein said conveying means is integrally provided with said cylinder means, said conveying means comprising:

a gear rack fixedly secured to said plurality of molding stations along the path of travel of said cylinder means;

motor means associated with said cylinder means for providing conveying power thereto; and engaging means operatively engaging said motor means and said gear rack.

16. An apparatus as in claim 15 wherein said engaging means includes a shaft turnable by said motor means, and a pinion gear fixed on said shaft for meshing engagement with said gear rack.

17. An apparatus as in claim 15 or 16 wherein said conveying means further comprises position sensing means for sensing relative movement of said cylinder means as it moves along said gear rack and for generating a position signal in response to movement of said cylinder means.

18. An apparatus as in claim 17 wherein said position sensing means comprises a rotary encoder and gear means operatively engaging said encoder and said motor means.

19. An apparatus as in claim 1 or 10, wherein each of said clamping stations are vertical clamping stations.

* * * * *